United States Patent [19]

Vito et al.

[11] 4,097,922
[45] Jun. 27, 1978

[54] AUTOMATIC REAL TIME NAVIGATION COMMUNICATOR

[75] Inventors: John L. Vito; Roderick S. Mesecar, both of Corvallis, Oreg.

[73] Assignee: The United States of America as represented by the Secretary of the Navy, Washington, D.C.

[21] Appl. No.: 739,411

[22] Filed: Nov. 8, 1976

[51] Int. Cl.$^2$ .................. H03K 13/24; G06F 15/50
[52] U.S. Cl. .................. 364/443; 235/92 BD; 340/198; 340/347 DD; 364/457
[58] Field of Search ........ 340/347 AD, 198, 347 DD; 324/83 D; 33/363; 235/92 EV; 364/424, 443, 457, 459

[56] References Cited

U.S. PATENT DOCUMENTS

| | | | |
|---|---|---|---|
| 3,533,097 | 10/1970 | Sleven | 340/347 SY |
| 3,573,801 | 4/1971 | Cohen et al. | 340/347 SY |
| 3,735,391 | 5/1973 | Games et al. | 340/198 |
| 3,745,544 | 7/1973 | Ono | 324/83 D |
| 3,787,835 | 1/1974 | Mathiesen | 340/347 SY |
| 3,827,045 | 7/1974 | Markus | 340/347 SY |
| 3,917,928 | 11/1975 | Wesner | 235/92 EV |

Primary Examiner—Felix D. Gruber
Attorney, Agent, or Firm—R. S. Sciascia; Charles D. B. Curry

[57] ABSTRACT

An automatic real time navigation communicator that communicates between the vehicle mounted speed and heading sensors and the vehicle mounted satellite navigator. The communicator automatically and at predetermined intervals updates the satellite navigator with the most current vehicle speed and heading parameters during those periods when the satellite navigator is not in communication with a satellite. The communicator is particularly useful on ships for processing heading sensor information presented in a 3-bit binary format and presenting both heading and speed information to the satellite navigator in parallel BCD format.

10 Claims, 3 Drawing Figures

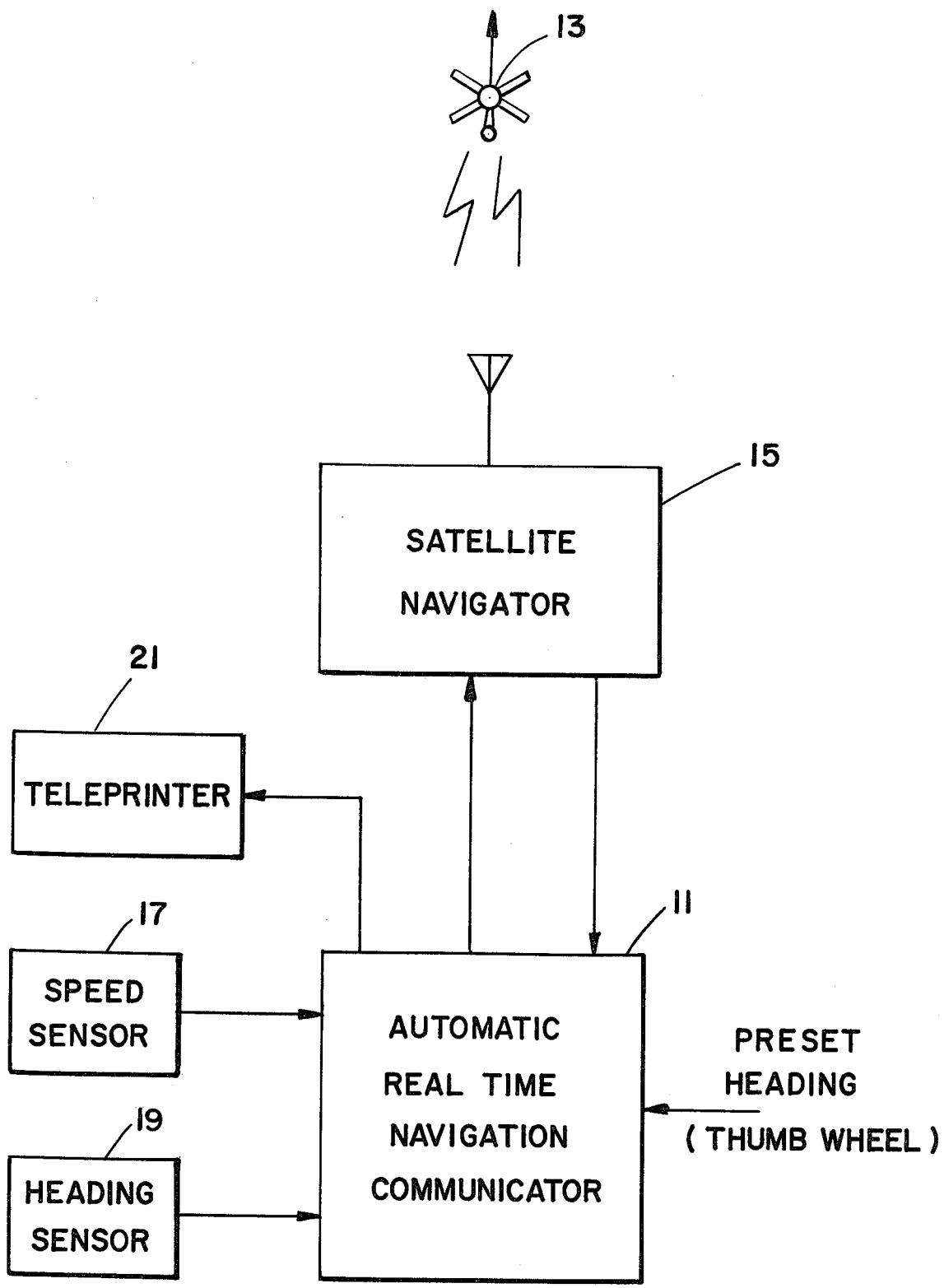
FIG_1

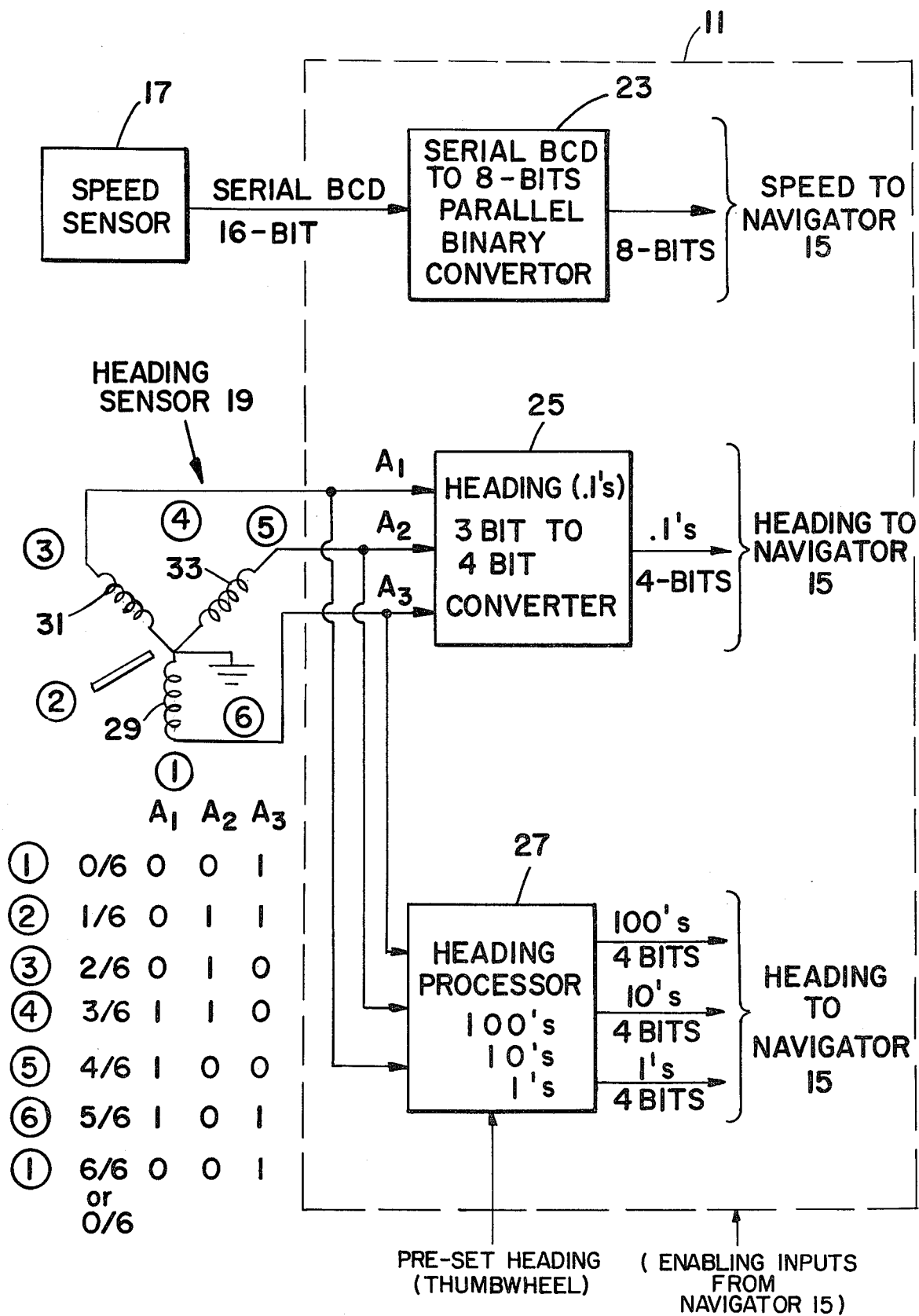
FIG _ 2

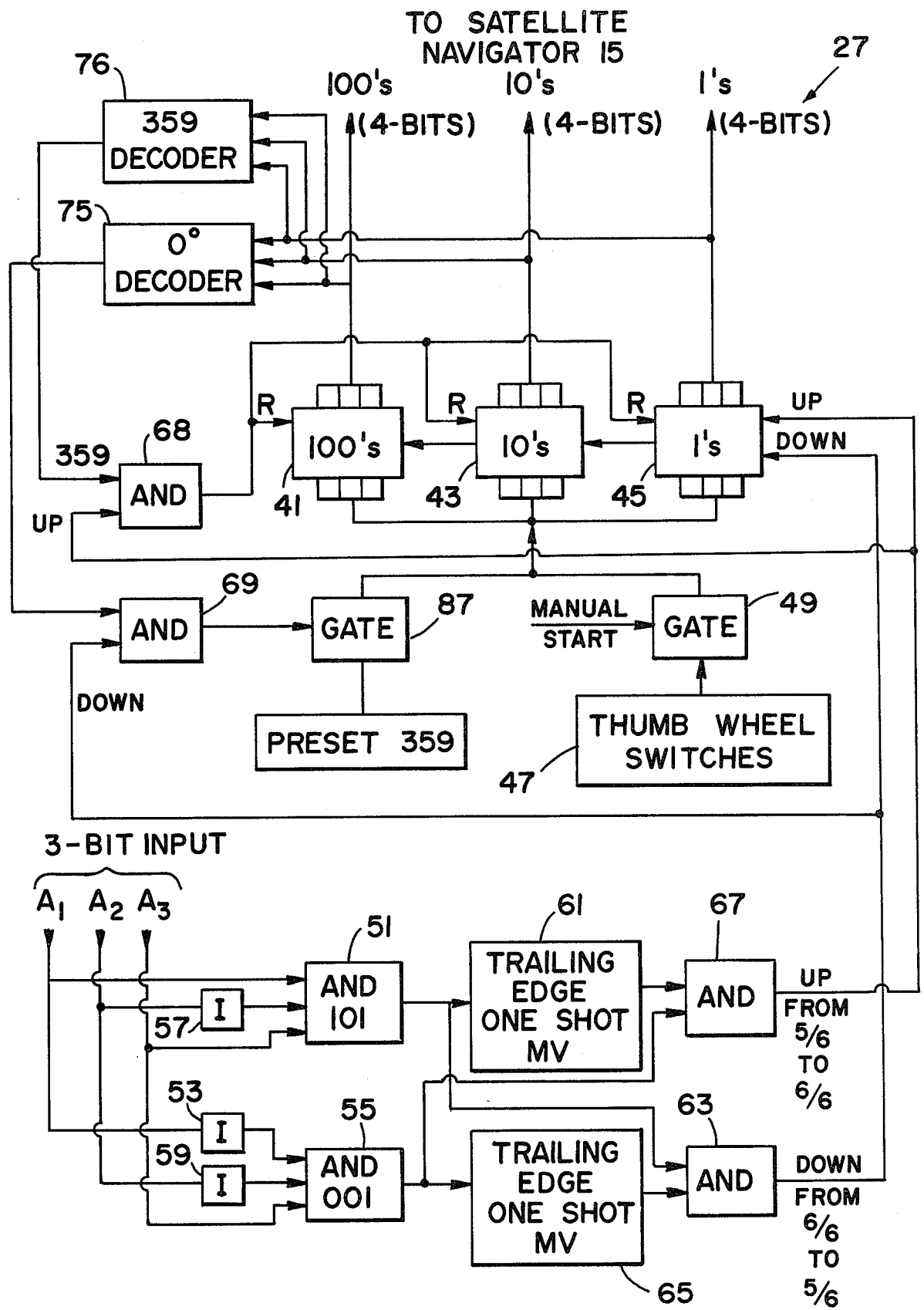
FIG_3

AUTOMATIC REAL TIME NAVIGATION COMMUNICATOR

BACKGROUND OF THE INVENTION

1. Field of the Invention

The present invention relates to a navigation system and more particularly to an automatic real time navigation communicator that updates a satellite navigator with speed and heading information.

2. Description of the Prior Art

Satellite navigation systems include a plurality of orbiting satellites that transmit highly accurate navigation parameters to a vehicle, such as a ship. The shipboard satellite navigator processes this information and provides a highly accurate location fix (longitude and latitude) of the ship at the time of the reception of the signal from the satellite. Satellite navigation systems of this type are well known to those skilled in the art, are highly complex and require a large number of orbiting satellites to provide navigation information to ocean going vessels throughout the world. In certain parts of the world, such as both polar regions, there is nearly continuous information from various orbiting satellites. Therefore, a satellite navigator can obtain a location fix in the polar regions at nearly any time. However, in other parts of the world the satellite navigator may be out of communication with an orbiting satellite for several hours. In the past provision has been made to manually update the satellite navigator with ship speed and ship heading information to provide a more accurate location fix during that period when the satellite navigator is not in communication with an orbiting satellite.

The present invention overcomes this manual updating of the satellite navigator by providing a real time navigation communicator that automatically updates the satellite navigator with the ship's speed and heading parameters.

SUMMARY OF THE INVENTION

Briefly, the present invention comprises an automatic real time navigation communicator that communicates between the vehicle mounted speed and heading sensors and the vehicle mounted satellite navigator. The communicator automatically and at predetermined intervals updates the satellite navigator with the most current vehicle speed and heading parameters during those periods when the satellite navigator is not in communication with a satellite. The communicator is particularly useful on ships for processing heading sensors information presented in a 3-bit format and presenting heading information to the satellite navigator in parallel BCD format, and speed information in parallel binary.

STATEMENT OF THE OBJECTS OF THE INVENTION

An object of the present invention is to provide a communicator that interfaces between real time navigation parameters and a periodically established precise navigation fix;

Another object of the present invention is to provide a vehicle mounted automatic real time navigation communicator that updates a vehicle mounted satellite navigator with speed and heading information from the vehicle mounted speed and heading sensors;

Still another object of the present invention is to provide a ship mounted automatic real time communicator for updating the ship mounted satellite navigator with speed and heading information from the ship mounted speed and heading sensors wherein the heading information is presented in 3-bit binary format;

Other objects, advantages and novel features of the invention will become apparent from the following detailed description of the invention when considered in conjunction with the accompanying drawings wherein:

BRIEF DESCRIPTION OF THE DRAWINGS

FIG. 1 is a block diagram of a satellite navigation system where the automatic real time navigation communicator of the present invention is used;

FIG. 2 is a block diagram of the general arrangement of the automatic real time navigation communicator of FIG. 1; and FIG. 3 is a schematic diagram of the details of the heading processor used in the automatic real time navigation communicator of FIG. 2.

DESCRIPTION OF THE PREFERRED EMBODIMENT

In FIG. 1 is illustrated the navigation system with which the automatic real time navigation communicator 11 of the present invention is used. The navigation system includes a satellite 13 that transmits highly accurate navigation parameters to a vehicle, such as a ship, wherein the shipboard satellite navigator 15 processes this information and provides a highly accurate location fix (longitude and latitude) of the ship at the time of the reception of the signal from the satellite 13. Satellite navigation systems of this type are well known to those skilled in the art, are highly complex and require a large number of orbiting satellites to provide navigation information to ocean going vessels throughout the world. In the past, provisions have been made to manually update the satellite navigator 15 with ship speed and ship heading information to provide a more accurate location fix during that period when the satellite navigator is not in communication with an orbiting satellite. The present invention is an automatic real time navigation communicator 11 that automatically and at predetermined intervals updates the satellite navigator 15 with the most current ship speed and heading parameters. The communicator 11 receives information from the ship speed sensor 17, the ship heading sensor 19, and enabling signals from the satellite navigator 15. The communicator 11 also has a thumbwheel control into which a reference heading may be preset to synchronize the communicator 11 with the heading sensor 19 which may be the ship gyro compass. Once this is done then the communicator will track the gyro compass on a real time basis as hereinafter explained in detail. The communicator 11 processes the information from speed sensor 17 and heading sensor 19 and transmits this information to the satellite navigator 15 on command from the satellite navigator. The satellite navigator then processes this information, by conventional techniques, and provides an updated readout of the ship's location which is converted within communicator 11 to a format which is compatible with various types of displays such as the teleprinter 21. It will be apparent to those skilled in the art that it may be necessary to change the format of the satellite navigator to be compatible with the format of the using device or display and that the particular timing must be compatible with the satellite navigator requirements.

In FIG. 2 is illustrated a block diagram of the general arrangement of the automatic real time navigation communicator 11 of the present invention. The communicator includes a 16-bit serial BCD to 8-bits parallel binary converter 23 for the speed and a 3 to 4 bit converter 25 for the tenths unit (0.1's) of the heading, and a heading processor 27 for the ones (1's), tens (10's) and hundreds (100's) of the heading. The outputs of converter 23, converter 25 and processor 27 are applied to the data input lines of navigator 15 upon command by navigator 15.

The output of speed sensor 17, which is illustrated as being a 16-bit serial format, is applied to the input of a conventional binary converter 23 where it is converted into an 8-bit parallel format which is compatible with the input circuitry of navigator 15. The output of heading sensor 19, which is a 3-bit parallel format $A_1 A_2 A_3$, is applied in parallel to the respective inputs of converter 25 and to processor 27. The details of heading processor 27 will be hereinafter described with respect to FIG. 3.

Heading sensor 19 may be a conventional gyro compass that has three coils 29, 31 and 33 six reference positions. Each of the six reference positions represent one sixth of a degree of compass rotation. The movement of the compass through one degree causes current to be set up, by well known gyro compass practices, in the three coils as illustrated by the binary symbols (1 or 0) associated with $A_1 A_2 A_3$ as shown in the diagram in FIG. 2. That is, position 1, which represents the compass as being on a unit degree, will have current passing through coil 29 to ground and no current passing through coils 31 and 33. Therefore, the inputs to converter 25 and processor 27 will be the 3-bit binary representation $A_1 A_2 A_3 = 001$. In position 2, which represents 1/6 degree past a unit degree, current will pass through coils 29 and 31 and not coil 33 and therefore heading sensor 19 will have a 3-bit output of $A_1 A_2 A_3 = 011$. In position 6, which represents 5/6° past a unit degree, current will pass through coils 29 and 33 and not coil 31 and therefore heading sensor 19 will have a 3-bit output of $A_1 A_2 A_3 = 101$. In this manner the communicator 11 monitors only that part of the gyro compass or heading sensor 19 that has a 3-bit binary expression of the 1/6° changes in heading. The communicator does not monitor the absolute heading (the 100's, 10's and 1's of the 360° of the compass) but only the changes in heading by 1/6 degree increments. It should be noted that the absolute heading of the compass is preset into the communicator 11 and therefore the absolute heading of the communicator is synchronized with the absolute heading of the gyro compass even though the ship is undergoing changes in heading. This makes it possible for the processor 27 of FIG. 3 to monitor and continuously process only 3-bits of information rather than additional bits of information which would be required if all of the digits of the heading from the heading sensor 19 were being processed. It should be noted that 8-bits of data are all that are needed to specify the speed input to the satellite navigator, and that heading needs to have 16 bits of parallel logic (that is, 4-bits for each of 100's, 10's, 1's and 0.1's). This formatting is achieved by conventional converter 23, conventional converter 25, and by processor 27 of the present invention.

The details of heading processor 27 are shown in FIG. 3. Processor 27 includes BCD counters 41, 43 and 45, having 4-bits each, which represent 100's, 10's, and 1's respectively. The 12-bit binary representation of the first 3 digits of the heading sensor is preset into thumbwheel switches 47. The outputs of thumbwheel switches 47 are applied through gate 49 to the inputs of counters 41, 43 and 45. Gate 49 is manually turned on and then off after counters 41, 43, 45 have been loaded with the 12-bit BCD representation of switches 47.

The 3-bit binary outputs $A_1 A_2 A_3$ of heading sensor 19 are applied to the input of the heading processor 27. The $A_1$ input is applied directly to one input of AND gate 51 and through inverter 53 to one input of AND gate 55. The $A_2$ input is applied through inverter 57 to another input of AND gate 51 and through inverter 59 to another input of AND gate 55. The $A_3$ input is applied directly to the third inputs of AND gates 51 and 55. From this it can be seen that AND gate 51 will provide an output signal when the heading sensor output is $A_1 A_2 A_3 = 101$ or is in the 6 position which represents the 5/6 degrees position of the gyro compass. In addition, AND gate 55 will provide an output signal when the heading sensor output is $A_1 A_2 A_3 = 001$ or is in the 1 position which represents the 0/6 or 6/6 degree position. The output of AND gate 51 is applied to the input of trailing edge responsive one shot multivibrator 61 and to one input of AND gate 63. The output of AND gate 55 is applied to the input of trailing edge responsive one shot multivibrator 65 and to one input of AND gate 67. The output of AND gate 67 is applied to the increment input of counter 45 and to one input of AND gate 68. The output of AND gate 63 is applied to the decrement input of counter 45 and to one input of AND gate 69.

The outputs of counters 41, 43, and 45 are connected to the inputs of satellite navigator 15, 0° decoder 75, and to 359° decoder 76. Decoders 75 and 76 respectively provide outputs when the output of counters 41, 43, and 45 are the numbers 0 and 359.

OPERATION

Initially, the thumbwheel switches 47 are set to correspond with the direction of the whole numbers of the heading sensor 19. The gate 49 is manually opened to set the 12-bit BCD representation of the initial whole number heading into counters 41, 43, and 45. After the counters are set then gate 49 is manually closed. Assuming the ship's gyro was at a heading of 359 and 0/6 degrees, then the BCD number representing 359 will be applied to the input of decoder 76 and $A_1 A_2 A_3 = 001$ will be applied to the inputs of AND gates 51 and 55 and to inverters 53, 57, and 59. Since signals are not applied to all three inputs of AND gate 51 it will not provide an output signal and AND gate 63 will always remain off in the 0/6 or 6/6 position. It should be noted that decoder 76 will provide an output signal that is applied to the input of AND gate 68. However, AND gate 68 will remain off because AND gate 67 is off. However, as will be hereinafter explained, AND gate 67 will be on in certain situations.

As the ship's direction changes and the heading increases then $A_1 A_2 A_3$ outputs will change from the 0/6 to the 1/6, 2/6, 3/6, 4/6, 5/6 to 6/6 (or 0/6 or 360° position). Neither of AND gates 51 or 55 will provide an output signal when $A_1 A_2 A_3$ are in the 1/6, 2/6, 3/6, 4/6 position since all three inputs to either of AND gates 51 and 55 are not on. Therefore, in all but the 5/6 and 0/6 (or 6/6) positions both of AND gates 63 and 67 will be always off.

It should be particularly noted that the time durations of each of trailing edge responsive multivibrators 61 and 65 are selected to be less than the time required for the heading sensor 19 to move all six positions (whether up or down in numerical value) and long enough to be recognized by AND gates 63 and 67. Therefore, as the ship's heading increases from the 5/6 to 6/6 (or 0/6) position AND gate 67 will provide an output signal. This is because AND gate 51 has changed its output from a one to a zero the trailing edge of which triggers one shot multivibrator 61 which provides an output signal to one input of AND gate 67. At the same time (6/6 position) AND gate 55 has turned on and therefore AND gate 67 provides an output signal. The duration of the one shot signal is long enough to ensure proper operation of AND gate 67 and counter 45 and shorter than the time duration required to move six steps. At this time AND gate 68 will turn on which will then reset counters 41, 43, and 45 to zero. As the ship's heading increases through the next five 1/6 steps there will be no signal applied to register 45. However, on the sixth step from 5/6 to 6/6 then AND gate 67 will provide an output signal and counter 45 will increment by 1. This process will continue until the count reaches 360 when counters will be again reset to zero by having an output signal from AND gate 68.

Assume counters 41, 43, and 45 contain a zero (0°) and the ship's bearing is decreasing. In this situation the gyro change will be from 6/6 (or 0/6) to 5/6. When this condition occurs then AND gate 63 will provide an output signal and decoder 75 will provide an output signal. Therefore, AND gate 69 will provide an output signal and gate 87 will turn on and set counters 41, 43, and 45 with the number 359. As the ship's course continues to decrease in value then the next shift from 6/6 to 5/6 will result in AND gate 63 providing an output signal that will decrement counters 45, 43, and 41 from 359 to 358. The process will continue to zero and then repeat itself.

What is claimed is:

1. An automatic real time navigation communicator for use with a satellite navigator wherein the heading defined by the navigator is defined by a first binary word defining hundreds, a second binary word defining tens, a third binary word defining ones and a fourth binary word defining tenths and for use with a sensor that defines change in heading by a fifth binary word defining sixths wherein:
    (a) said communicator includes a first binary counter, a second binary counter and a third binary counter connected in series and for respectively storing and counting hundreds, tens and ones;
    (b) first means for loading said first, second and third counters with binary bits that correspond with the same binary bits as in said first, second and third binary words;
    (c) second means responsive to changes in said fifth binary word for modifying the binary word in said third counter; and
    (d) third means for transferring the binary words in said first, second and third counters to said satellite navigator.

2. The communicator of claim 1 wherein:
    (a) said fifth binary word comprises a group of 3-bits representing sixths.

3. The communicator of claim 2 including:
    (a) fourth means responsive to said fifth binary word for converting said 3-bit representation of sixths into a 4-bit representation of tenths and transferring said 4-bit representation to said satellite navigator to modify said fourth binary word.

4. An automatic real time navigation communicator comprising:
    (a) a first converter for converting information from a first sensor from a first binary format into a second binary format, the output signal of said first converter being one input to said navigation communicator;
    (b) a second converter for converting information from a second sensor that represents the first place of a number from a first binary format into a second binary format, said second converter electrically connected to said first converter and the output signal of said second converter being another input to said navigation communicator; and
    (c) a processor connected to said second converter and directly receiving the output from said second sensor for processing the information from said second sensor to provide the second, third and fourth places of said number as modified by changes in the first place of said number.

5. The communicator of claim 11 including:
    (a) a first binary counter, a second binary counter and a third binary counter connected in series and for respectively storing and counting said second, third and fourth places of said number;
    (b) first means for loading said first, second and third counters with binary bits that correspond with the second, third and fourth places of said number; and
    (c) second means responsive to changes in said first place for modifying the bits in said first, second and third counters.

6. The communicator of claim 5 wherein:
    (a) said first binary format from said second sensor has 3-bits.

7. An automatic real time communicator including a processor:
    (a) said processor including a first binary counter, a second binary counter and a third binary counter connected in series;
    (b) first means for receiving information from a sensor;
    (c) the output of said first means operatively connected to the input of said first counter and to second and third means; and
    (d) said second and third means operatively connected to the inputs of said first, second, and third counters for selectively modifying the inputs of said first, second, and third counters in response to said output of said first means and to the outputs of said first, second, and third counters.

8. The processor of claim 7 wherein:
    (a) said first means includes first, second, third, and fourth AND gates and first and second trailing edge responsive one shot multivibrator;
    (b) the output of said first AND gate connected to the input of said first multivibrator and to the input of said fourth AND gate, the output of said second AND gate connected to the input of said second multivibrator and to the input of said third AND gate; and
    (c) the output of said third AND gate connected to the increment input of said first counter and the output of said fourth AND gate connected to the decrement input of said first counter.

9. The processor of claim 8 wherein:
    (a) said second means includes a first decoder, a fifth AND gate, a gate and a memory containing a first preset number; and (b) the output of said first, second, and third counters connected to the input of said first decoder the output of which is connected to one input of said fifth AND gate, the ouput of which is connected to the gate input of said gate, the output of said memory connected through said gate to the set inputs of said first, second, and third counters and the output of said fourth AND gate connected to the other input of said fifth AND gate.

10. The processor of claim 9 wherein:

(a) said third means includes a second decoder and a sixth AND gate;
(b) the outputs of said first, second, and third counter connected to the inputs of said second decoder the output of which is connected to one input of said sixth AND gate, the output of which is connected to the reset inputs of said first, second, and third counters and the output of said third AND gate connected to the other input of said sixth AND gate.

* * * * *